July 18, 1933. J. MELLOR 1,918,707
PISTON RING
Filed March 18, 1931 3 Sheets-Sheet 2
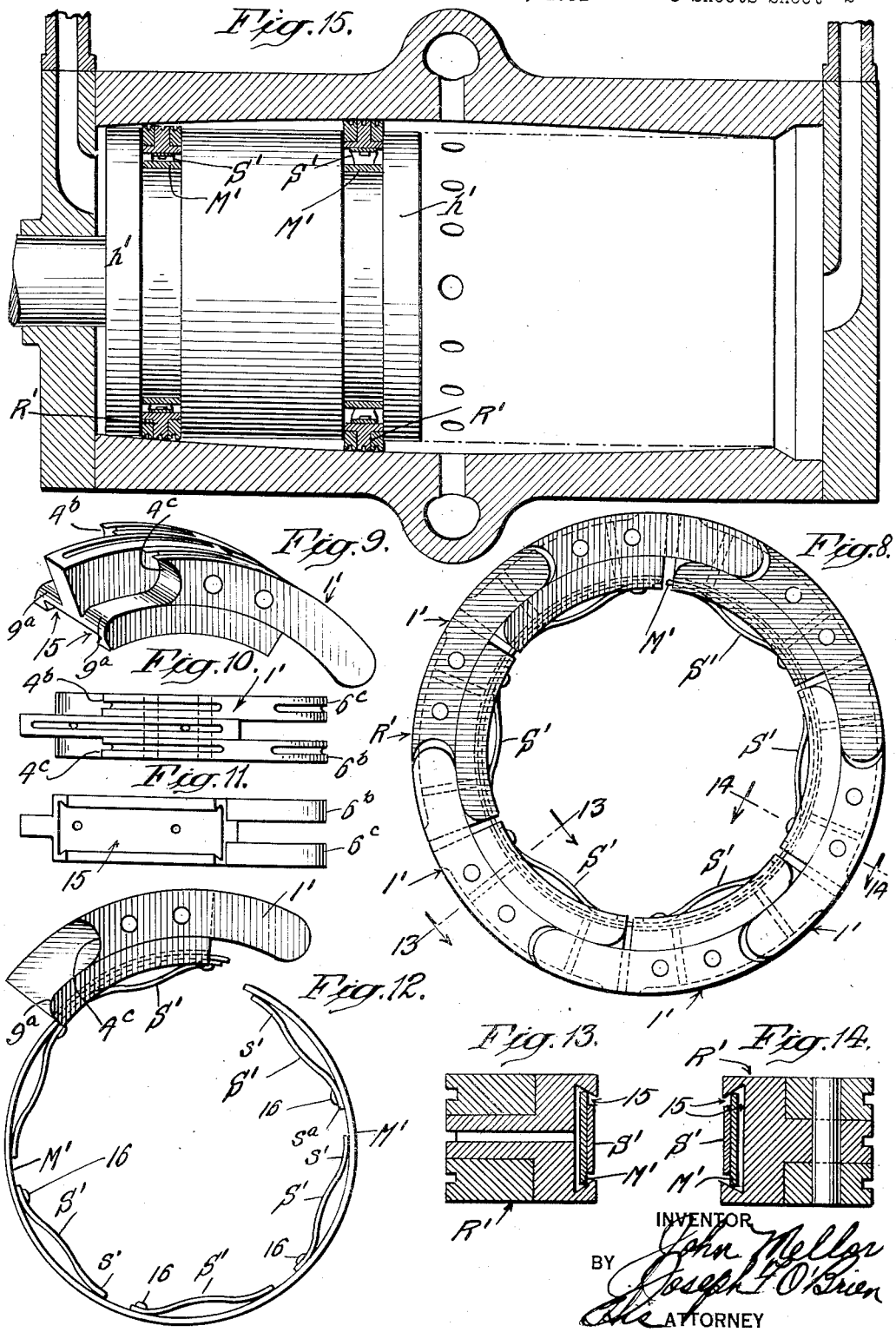
INVENTOR
John Mellor
Joseph F. O'Brien
BY
ATTORNEY July 18, 1933.     J. MELLOR     1,918,707
PISTON RING
Filed March 18, 1931     3 Sheets-Sheet 3
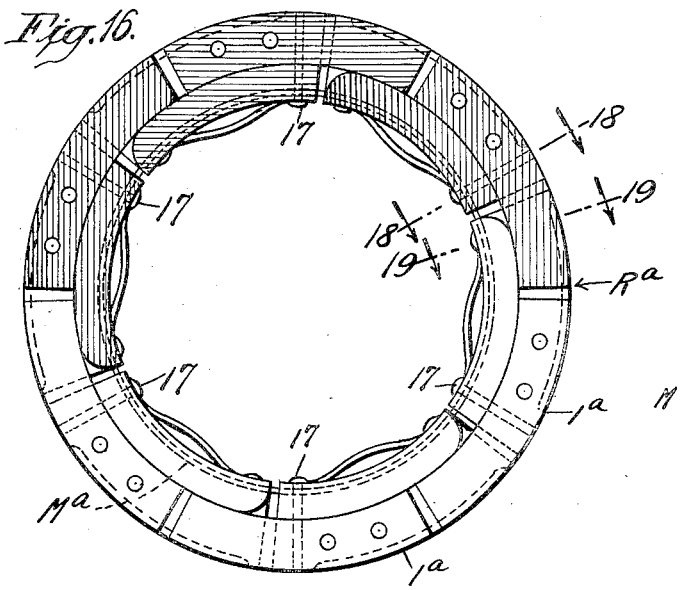
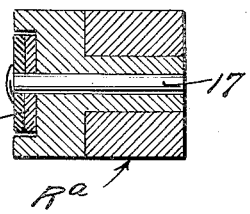
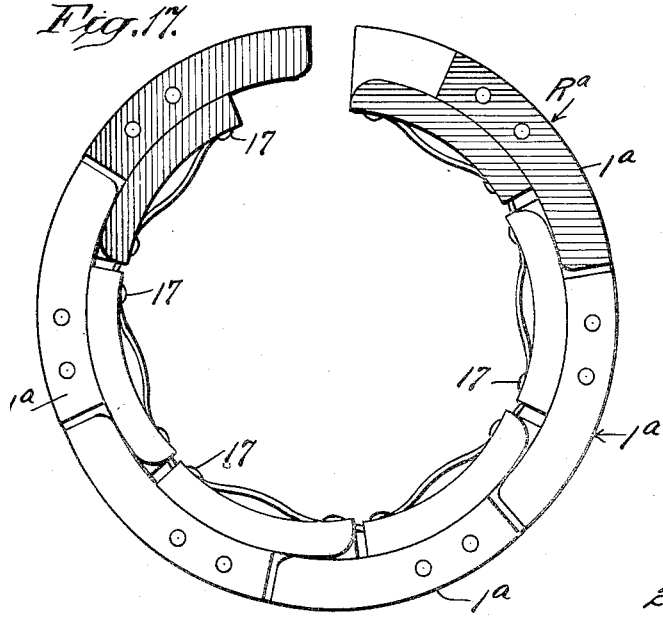
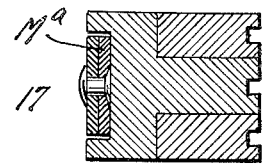
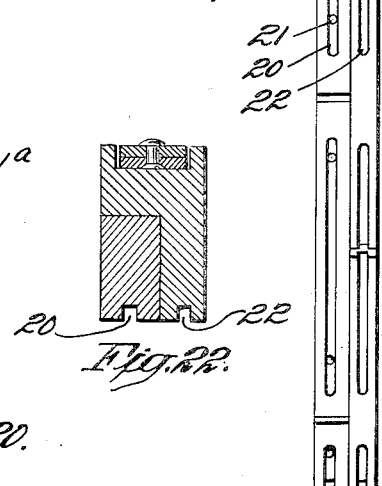
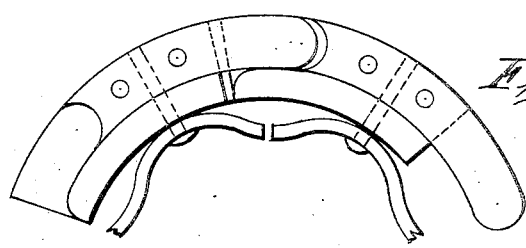

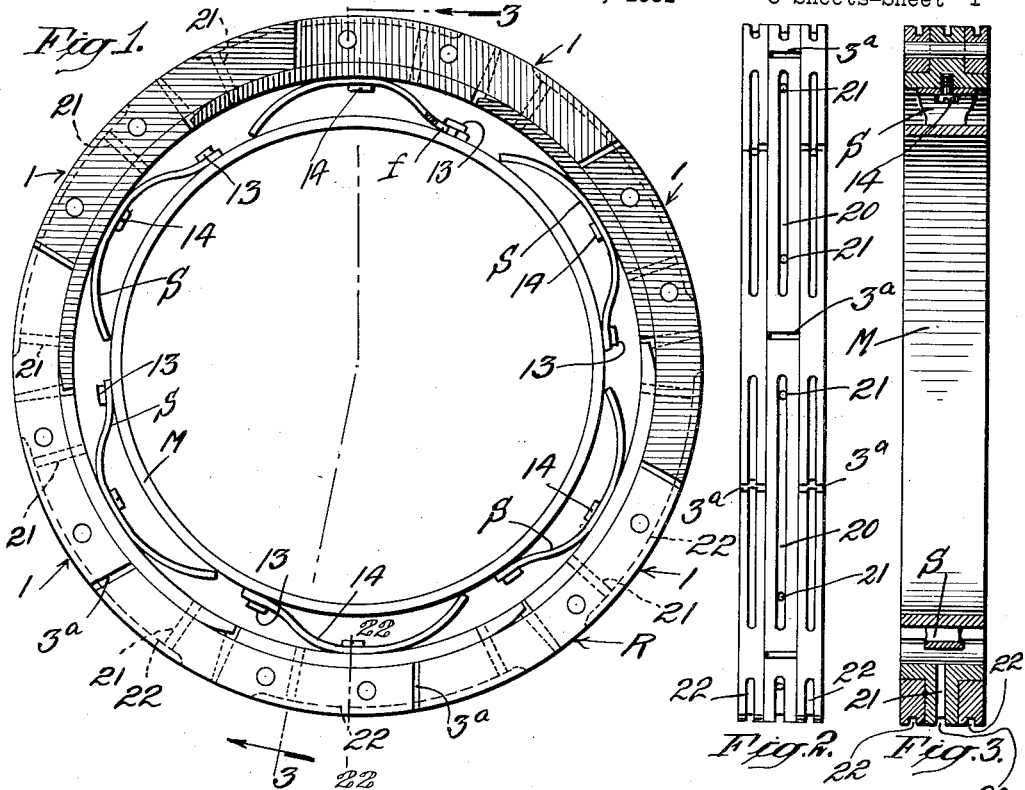
July 18, 1933.                    J. MELLOR                    1,918,707
                                 PISTON RING
                           Filed March 18, 1931              3 Sheets-Sheet 1

Patented July 18, 1933

1,918,707

UNITED STATES PATENT OFFICE

JOHN MELLOR, OF BAY HEAD, NEW JERSEY

PISTON RING

Application filed March 18, 1931. Serial No. 523,473.

This invention relates to improvements in piston rings and is more particularly designed for the pistons of steam, gas, oil or gasoline engines, pumps, compressors and the like.

Piston rings have heretofore either been made in one or two pieces of inherently resilient material or when made of rigid segments combined with separate springs have, at the most, been made of three loose segments which were difficult to handle and to apply to a piston, and among objects of this invention are to produce a piston ring composed of a plurality of rigid metallic segments so mounted on or connected with a holder member or mounting element and combined with an expansion spring or series of springs as to comprise a single ring unit which is capable of ready and easy handling and application to a piston to provide a piston ring of the type specified which will have sufficient flexibility to cause expansion and to permit contraction of the ring so as to produce, in any position within the limits of such expansion or contraction, a vapor tight joint with the cylinder of an engine or other external contacting surface and to accomplish this function without binding, unusual friction or upsetting of the correct registration of the piston; to provide a ring construction in which a holder or mounting element may be utilized as a spacing guide for the segments; to produce a piston ring composed of rigid metallic segments of less than quadrant extent so as to provide greatly increased flexibility and the production of a ring in which the segments will be capable of producing a vapor-tight joint immediately upon the application of the ring to a piston and also after the ring has been in use and subjected to service temperatures; to produce a piston ring embodying rigid segments having overlapping mating ends, each having a countersink at one end and a projection at the opposite end with the ends of said segments contacting respectively with the ends of adjacent segments and the countersinks and projections providing radial and axial overlapping portions or contacting surfaces to the end that a vapor-tight joint may be produced and always maintained irrespective of the relative movement of the contacting portions during expansion or contraction of the ring and I preferably utilize countersinks and projections having radial overlaps at opposite sides of an axial overlap.

Still another object of my invention is to produce a ring comprising a plurality of segments and preferably a plurality of segments of less than quadrant extent which may be installed as a split ring unit capable of being opened for ready application to a solid piston and which in my preferred embodiment comprises a structure of independently-movable segments which will co-act and cooperate with each other to provide continuous contact; to produce a ring in which the abutting surfaces of the overlapping projections and countersinks will have, during the expanding and contracting movements of the ring, a rolling contact and to this end to provide one of the abutting surfaces or overlapping portions of the countersinks and projections with a differential curvature having radii decreasing from its connection with the body of the segment toward the end thereof; to provide a piston ring construction in which the component segments may expand or contract equally or unequally to produce a tight joint; which may be used to wear new cylinders evenly so as to cause a vapor-tight joint to be obtained; which may be utilized with cylinders which are not absolutely true; which may be applied so as to operate in vapor-tight relationship with used cylinders which are worn out of round; which will expand and contract to compensate for wear; which will act as a resilient guide of equal pressure for a piston in its travel; which will operate efficiently and be unaffected by vibration or the uneven travel of the piston; which will compensate for variations in diameter of the cylinder due to temperature changes and which will increase the operating efficiency of an engine by reducing the amount of fuel necessary to drive the same per unit of power.

Still another object of my invention is to enable the economic manufacture of a ring of the type specified.

Another object is to provide a ring construction having means for equalizing the vapor pressures on the concave and convex sides or surfaces of the ring.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a view, in side elevation, of a segmental piston ring of my invention suitable for pistons having removable heads or caps;

Fig. 2 is an end elevation of the ring shown in Fig. 1;

Fig. 3 is a section on the line 3—3 of Fig. 1, looking in the direction of the arrow;

Fig. 4 is a view, in perspective, of one of the segments included in the ring shown in Figs. 1 to 3;

Fig. 5 is an outside view, in elevation of the segment shown in Fig. 4;

Fig. 6 is an inside view, in elevation of the same segment;

Fig. 7 is a vertical section of a cylinder and piston having a removable cap or head and having a segmental ring such as shown in Figs. 1 to 6 applied thereto;

Fig. 8 is a view, in side elevation, of a segmental ring capable of being applied in one or more pieces to solid pistons;

Fig. 9 is a view, in perspective, showing one of the segments included in the ring shown in Fig. 8;

Fig. 10 is a top view, in plan, of the segment shown in Fig. 9;

Fig. 11 is a bottom view, in plan, of the segment shown in Figs. 9 and 10;

Fig. 12 is a view, in side elevation, of a resilient mounting element or holder employed in mounting the segments of the ring illustrated in Figs. 8 to 11 and showing a single segment mounted thereon;

Fig. 13 is a section on the line 13—13 of Fig. 8, showing the pressure-equalizing aperture employed in rings;

Fig. 14 is a section on the line 14—14 of Fig. 8, looking in the direction of the arrow;

Fig. 15 is a section of a solid piston and exaggerated barrel-shaped cylinder to which the rings illustrated in Figs. 8 to 14 may be applied;

Fig. 16 is a view in side elevation, of an openable ring having the segments mounted on and fastened to a flexible mounting element or holder such as shown in Fig. 12, the segments being shown in service position or contracted relationship;

Fig. 17 is a view of a ring similar to Fig. 16 in which the mounting element is sprung apart to enable opening and application of the ring in one piece to a solid piston;

Fig. 18 is a section on the line 18—18 of Fig. 16, looking in the direction of the arrow;

Fig. 19 is a cross section on the line 19—19 of Fig. 16, looking in the direction of the arrow;

Fig. 20 is a view, in side elevation, of a resilient mounting element or holder of wave-shaped conformation employed in mounting segments of the ring such as illustrated in Figs. 8 to 19;

Fig. 21 is an end elevation of a modified form of ring having a single axial and radial overlap instead of a double radial overlap shown in Figs. 1 to 19; and Fig. 22 is a section on the line 22—22 of Fig. 21, looking in the direction of the arrow.

Referring now to these drawings and particularly to Figs. 1 to 7, P (Fig. 7) indicates a piston having a removable head $h$ fastened to the piston by bolts $b$ to form a piston-ring groove $g$ having a removable wall to permit ready insertion of a piston-ring R. The ring R is seated in said groove, held in place by the fastening of the head, and reciprocates with the piston, in a cylinder C.

The ring R comprises a series of similar segments 1 each composed of rigid metal so mounted or connected together in a holder or mounting member M and so combined with an expansion spring S or springs as to cause expansion and permit contraction and to produce a ring of such flexibility as to permit the making between the outer periphery thereof and the internal surface of an engine cylinder or the like of a tight joint.

Each of my expanding and contracting rings R is, in the embodiment shown, composed of segments having overlapping mating ends and also preferably having an inter-communicating groove in its interior or concave annular surface for the reception of one or more expansion springs S. Such segments are designed to expand and contract without disrupting the interlocking device or seal formed between the said mating ends of the segments. It will be understood that the said rings R will have free movement within the grooves $g$ in the piston so as to permit expansion by the springs to compensate for any unevenness in movement or any vibration of the piston on which they are applied and also to compensate for any variations in curvature of the cylinder wall and that the component segments of the ring will be caused to expand by the springs and to be contracted by the walls of the cylinder equally or unequally so as to produce a vapor-tight joint and that such rings may be used to wear new cylinders evenly so as to be vapor-tight or may be utilized with cylinders which are not absolutely true; may be applied so as to operate in vapor-tight relationship with used cylinders which are worn out of round; which will be so expanded and contracted to compensate for wear and, furthermore, because of the equal pressure of the springs will act as a resilient guide of equal pressure for a piston in its travel and particularly for pistons of the vertical-travel type and, furthermore, will operate efficiently and be unaffected by any vibration or uneven travel of the piston and will compensate for variations in diameter of the cylinder due to temperature changes and will also increase the operating efficiency of an engine by reducing the amount of fuel necessary to drive the same per unit of power.

The rings R, in the preferred embodiment of my invention, when fully extended have spaces 3ª between the radial end surfaces 4, 4', 4ª and the surfaces 6, 6', 6ª of adjacent segments. In this extended position of the ring R the curvature of the outer surfaces 7 is concentric with the curvature of the surfaces 8 and such segments are each preferably of less than quadrant extent so that the angle which is subtended by an arc of limited length of a single segment will not exceed ninety (90°) degrees. By reason of the shortening of the arc of the segment within this angular limitation, I am enabled (1) more readily to compensate for the differences in curvature between the peripheral surface of the ring and the internal annular surface of the cylinder which may be due to imperfections in workmanship, expansion or contraction of different metals, uneven wear and other causes; (2) the flexibility of the ring is greatly increased over rings in which the segments are of greater than quadrant extent; (3) amount of variation in extreme radii of surfaces is reduced and (4) the joint movement between the segmental ends is decreased by said limitation as compared with the segmental arc of a greater subtending angle.

It will be readily apparent, that, where expanding and contracting segmental rings, having in one position, concentric curved surfaces of different radii and where one of said surfaces, as 7 for instance, is subject to change of curvature, due to wear, and where other curved surfaces, such as 8 and 9 formerly of identical radii, suffer change of distance from common center to any point, without corresponding change in surface curvature, the concentric relation is upset. The pressures acting upon the peripheral surface of the ring, mainly consisting of a fluent substance as a gas or liquid and the springs, producing equal outward pressures, the segments will wear substantially evenly and in a path of the radii of curvature, maintaining substantially a true curve of such surfaces. While the assembled ring R is flexible, the component segments are individually rigid, and for the above reasons, in process of expansion, surfaces such as 8 and 9, increase toward the outer ends, recede from the center at a proportionately slower rate causing surface 8 to pivot at extremity of plane of curve 9. Such effect produces an unbalancing contact between outer end of surface 9 and inner end of surface 8. To avoid this unbalancing contact of said surfaces, one of the contacting surfaces and, as shown, the surface 9 is formed of a differentially-varying curvature by which I mean a curve having radii varying gradually within certain limits and, as illustrated, the curve of differential radii comprises a compound curve of varying radii. By this variation of surface 9 a constant line of tangency is formed between surfaces 8 and 9 in an expanding and contracting movement of ring R thus forming a tight joint. I further provide radial surfaces of contact between plane surfaces 10 in the countersunk end of one segment and plane surfaces 11 in the projecting end of an adjacent segment forming a liquid or vapor-tight joint between them. Radial surfaces 12 similar on all segments of a ring, form close joints with an inner radial surface of a groove $g$ in the piston P. Since these rings operate under spring pressure supplemented by liquid and gaseous pressure, said pressures acting equally in all directions against the inner annular surface 8' of the ring, since the ring segments are held uniformly in place by springs S, and since the adjustments by the compounding curve of the peripheral surfaces 8 provides a sliding surface of contact with surfaces 9 and since there is a sliding contact between surfaces 10 and 11; also a sliding contact between radial surfaces 12 with the sides of the groove $g$, the construction as composed of separate interlocking segments forms a ring, (1) compensating as to irregularities of travel of the piston P, (2) flexible as to variations in the periphery of the cylinder C, (3) capable of expansion or contraction to compensate for condition of wear of the internal surface of the cylinder C, with the desirable effect of a vapor-tight joint.

The use of contacting or overlapping surfaces, one of which surfaces is provided with a differential curvature, is fully described and is also broadly claimed for use in metallic packing in my co-pending application, Serial No. 586,054, filed September 4, 1922 and entitled "Metallic packing".

In my present application, I have produced a construction in which a somewhat similar contact may be formed between the overlapping portions of the segments and, therefore, I do not, in this application, broadly claim this feature as applied to all types of packing.

In the instant application, however, the rings are intended for a different service, are contracted by the surface of the cylinder instead of being expanded by the surface of the reciprocating member and I found it necessary and desirable to modify the ring materially and in many important particulars in order to enable the features hereinabove specified to be applied thereto. Furthermore, the feature of the instant application, so far as the mounting or holder member is concerned, is applicable to all piston rings formed of a plural number of rigid segments which are adapted to be expanded by a spring separate and apart from the inherent resilience of the metal of the ring and which will be expanded by such springs and contracted by the walls of a cylinder or the like and which will at all times produce a tight joint.

In the preferred embodiment of my invention, each of the segments has fastened thereto a spring S so that each of the segments will be caused to have an expanding movement independently of the others. Such springs, in the said preferred embodiment of my invention, also have a connection with a mounting element or holder ring M so that the entire ring R may be handled and utilized as a single unit.

In Fig. 1, a series of springs S are utilized for the segments of the piston ring R. Each spring S has its middle portion fastened to the middle of a segment 1 of the packing ring R, one end thereof has a loose connection with a mounting ring M and the other end is free and abuts against said mounting ring so as to permit movement of said spring in relation to the mounting ring. In the embodiment shown in said Fig. 1, one end of the spring S is provided with a fork $f$ which is adapted to fit over a headed pin or stud 13 on the mounting ring M and is fastened intermediate its ends at its middle portion by the screw 14 to a segment 1 of the ring R.

In Figs. 9 to 15, I have shown another form of spring-mounting for the ring segments. In these figures, the internal annular surface of each segment 1' of the ring R' is provided with a dove-tail groove 15 and a split spring mounting ring M' carrying a series of auxiliary expansion springs S' is threaded through the grooves 15 of the said segments, thus connecting all of said segments together so as to permit a ready handling thereof. In this embodiment, each of the expansion springs S' are fastened at one end $S^a$ by a rivet 16 to the annular, split mounting-ring or holder ring M' and the opposite end $s'$ is permitted to have freedom of movement on said split mounting ring M' while the middle portion is raised and adapted to engage the bottom surface of the piston groove $g$. In this construction, the surfaces $4^b$, $4^c$ and the adjacent surfaces $6^b$, $6^c$ are concavely and convexly curved and the corners at the ends $9^a$ are rounded off to permit greater expansion or limiting movement between the segments to enable opening movement at the split of the mounting ring.

Obviously a spring of this type is capable of ready handling and easy application to a piston. In such application to a piston, all of the segments may be separated at the same point as split of the split-ring, thus providing a piston ring split at one point which may thus be expanded beyond its ordinary limits of expansion so as to enable ready application to a solid piston or over irremovable heads $h'$ such as shown in Fig. 15.

In the case of application to solid pistons, the whole ring in some cases may be applied at one time or the mounting ring may be first applied and the rigid segments may thereafter be threaded onto said mounting ring.

In Figs. 16 to 19, I have shown another form of ring $R^a$ in which segments $1^a$ are securely riveted by rivets 17 to an annular mounting ring $M^a$. In this construction, the annular mounting ring $M^a$ is split and the overlaps and countersink are so shaped as to permit a sufficient hinging movement therebetween as to enable the segment not only to have the flexible movements hereinabove referred to but also to open outwardly with the split mounting ring $M^a$ and thus so as also to be capable of application to a solid piston.

In all of the ring segments shown, I provide in the peripheral surfaces thereof, a series of pressure-equalizing blind grooves 20 which communicate by means of radial holes 21 with the internal surface of the segment so that fluid pressure on the peripheral surface of the rings may be equalized by admitting such fluid through the radial holes 21 to the space between the bottom of the piston groove and the internal annular surface of the rings.

Other grooves 22 are preferably formed on opposite sides of the grooves 20 and these grooves serve to provide direct equalizing pressures with apertures $3^a$ direct to cylinder on the outer annular surface of the ring R, R', $R^a$ to correct insufficient pressures as may be provided by grooves 20.

Having described my invention, I claim:—

1. A piston ring comprising a single ring unit embodying, in combination, an annular mounting element, a series of rigid ring segments mounted around the periphery of said annular mounting element, and resilient means connected with the said mounting element and the said segments for resiliently forcing the segments outwardly.

2. A piston ring comprising a single ring unit embodying, in combination, an annular mounting element, a series of rigid ring segments mounted around the periphery of said annular mounting element, each segment being of less than quadrant extent between the shortest portions of the ends thereof, and resilient means connected with the said mounting element and the said segments for resiliently forcing the segments outwardly.

3. A piston ring comprising a single ring unit embodying, in combination, an annular mounting element, a series of rigid ring segments mounted around the periphery of said annular mounting element having overlapping mating segmental ends, and resilient means connected with the said mounting element and the said segments for resiliently forcing the segments outwardly.

4. A piston ring comprising a single ring unit embodying, in combination, an annular mounting element, a series of rigid ring segments mounted around the periphery of said annular mounting element having overlapping mating segmental ends, one of the contacting surfaces of said overlapping ends having a curvature varying differentially from the surface on the adjacent segment with which it contacts, and resilient means connected with the said mounting element and the said segments for resiliently forcing the segments outwardly.

5. A piston ring comprising a single ring unit embodying, in combination, an annular mounting element, a series of rigid ring segments mounted around the periphery of said annular mounting element, each having a countersink at one end and a projection at the opposite end adapted to contact respectively with projections and countersinks in adjacent segments and having a curvature varying differentially from the surface on the adjacent segment with which it contacts, and resilient means connected with the said mounting element and the said segments for resiliently forcing the segments outwardly.

6. A piston comprising a single ring unit embodying, in combination, an annular mounting element, a series of rigid ring segments mounted around the periphery of said annular mounting element, each having a plurality of countersinks at one end and a plurality of projectings at the opposite end adapted to contact respectively with similar plural projections and countersinks in adjacent segments and the surfaces at one end of each projection having a curvature varying differentially from the contacting surfaces on the adjacent segment with which it contacts, and resilient means connected with the said mounting element and the said segments for resiliently forcing the segments outwardly.

7. A piston ring comprising a single ring unit embodying, in combination, an annular mounting element, a series of rigid ring segments mounted around the periphery of said annular mounting element having overlapping mating segmental ends, each of such segments having at the ends thereof projections and countersunk seats and each segment being of less than quadrant extent between the most remote portions of the ends, and resilient means connected with the said mounting element and the said segments for resiliently forcing the segments outwardly.

8. A piston ring comprising a single ring unit embodying, in combination, an annular mounting element, a series of rigid ring segments mounted around the periphery of said annular mounting element having overlapping projections and countersinks and each segment being of less than quadrant extent between the most remote portions of the ends, each countersink having an annular surface of a curvature varying differentially from the surface on the adjacent segment with which it contacts, and resilient means connected with the said mounting member and the said segments for resiliently forcing the segments outwardly.

9. A piston ring comprising a single ring unit embodying, in combination, an annular mounting element comprising a split ring, a series of rigid ring segments mounted around the periphery of said annular mounting element, and resilient means connected with the said mounting element and the said segments for resiliently forcing the segments outwardly.

10. A piston ring comprising a single ring unit embodying, in combination, an annular mounting element comprising a split ring, a series of rigid ring segments mounted around the periphery of said annular mounting element, each segment being of less than quadrant extent between the shortest portions of the ends thereof, and resilient means connected with the said mounting element and the said segments for resiliently forcing the segments outwardly.

11. A piston ring for pistons and cylinders comprising a single ring unit and embodying a piston having a ring groove, a piston ring composed of a plurality of segments seated in said groove, having a vapor-tight connection with the sides thereof and spaced from the bottom of said groove, each of the segments of said ring having in its periphery an imperforate groove open only at one end to the edge of a segment and closed at the opposite end whereby a balancing pressure is produced on the surface of the ring and is admitted to said groove through the divisions between the ends of the segments.

JOHN MELLOR.